US012639623B2

(12) United States Patent
Lee et al.

(10) Patent No.: US 12,639,623 B2
(45) Date of Patent: May 26, 2026

(54) FAIR SELECTIVE CLASSIFICATION VIA A VARIATIONAL MUTUAL INFORMATION UPPER BOUND FOR IMPOSING SUFFICIENCY

(71) Applicants: International Business Machines Corporation, Armonk, NY (US); Massachusetts Institute of Technology, Cambridge, MA (US)

(72) Inventors: Joshua Ka-Wing Lee, Santa Monica, CA (US); Yuheng Bu, Philadelphia, PA (US); Deepta Rajan, Irving, TX (US); Prasanna Sattigeri, Acton, MA (US); Subhro Das, Cambridge, MA (US); Rameswar Panda, Medford, MA (US); Gregory Wornell, Wellesley, MA (US)

(73) Assignee: International Business Machines Corporation, Armonk, NY (US)

( * ) Notice: Subject to any disclaimer, the term of this patent is extended or adjusted under 35 U.S.C. 154(b) by 1052 days.

(21) Appl. No.: 17/565,411

(22) Filed: Dec. 29, 2021

(65) Prior Publication Data

US 2023/0206114 A1 Jun. 29, 2023

(51) Int. Cl.
*G06N 20/00* (2019.01)
*G06N 7/01* (2023.01)

(52) U.S. Cl.
CPC .............. *G06N 20/00* (2019.01); *G06N 7/01* (2023.01)

(58) Field of Classification Search
None
See application file for complete search history.

(56) References Cited

U.S. PATENT DOCUMENTS

| | | | |
|---|---|---|---|
| 10,193,699 | B2 | 1/2019 | Yiu |
| 10,817,788 | B2 | 10/2020 | Jayaraman |
| 2019/0147354 | A1 | 5/2019 | Gao |
| 2019/0378028 | A1 | 12/2019 | Chaudhuri |
| 2020/0057858 | A1 | 2/2020 | Sharma |
| 2020/0104849 | A1 | 4/2020 | Cai |
| 2020/0195435 | A1 | 6/2020 | Woods |
| 2021/0173395 | A1 | 6/2021 | Das |

FOREIGN PATENT DOCUMENTS

| | | |
|---|---|---|
| WO | 2016/094330 A2 | 6/2016 |
| WO | 2016943302 W | 6/2016 |

OTHER PUBLICATIONS

Jones. Jones, Erik, Shiori Sagawa, Pang Wei Koh, Ananya Kumar, and Percy Liang. "Selective classification can magnify disparities across groups." arXiv preprint arXiv:2010.14134. Apr. 14, 2021. (Year: 2021).*

(Continued)

*Primary Examiner* — Vincent Gonzales
(74) *Attorney, Agent, or Firm* — Edward J. Wixted, III

(57) ABSTRACT

One or more group-specific aggregate losses, one or more group-agnostic aggregate losses, and a joint loss are computed. A regularizer loss is computed based on the one or more group-specific aggregate losses and the one or more group-agnostic aggregate losses. One or more group-specific models are trained based on the one or more group-specific aggregate losses. A feature extractor is updated based on the regularizer loss and a joint classifier is updated based on the joint loss.

18 Claims, 11 Drawing Sheets

(56) References Cited

OTHER PUBLICATIONS

Rava, Bradley, Wenguang Sun, Gareth M. James, and Xin Tong. "A burden shared is a burden halved: A fairness-adjusted approach to classification." arXiv preprint arXiv:2110.05720. Oct. 19, 2021. (Year: 2021).*

Joshua Ka-Wing Lee, Yuheng Bu, Deepta Rajan, Prasanna Sattigeri, Rameswar Panda, Subhro Das, and Gregory Wornell, Fair Selective Classification via Sufficiency, In International Conference on Machine Learning Jul. 1, 2021 (pp. 6076-6086). PMLR. (grace period disclosure).

Baharlouei et al., "Rényi Fair Inference", arXiv, Jun. 28, 2019, 11 pages.

Barocas et al., "Fairness and Machine Learning", retrieved from the link- http://www.fairmlbook.org, 2019, 294 pages.

Bellamy et al., "AI Fairness 360: An extensible toolkit for detecting, understanding, and mitigating unwanted algorithmic bias", arXiv, Oct. 3, 2018, 14 pages.

Borkan et al., "Nuanced metrics for measuring unintended bias with real data for text classification". In Companion Proceedings of The 2019 World Wide Web Conference, 2019, 10 pages.

Calders et al., "Building classifiers with independency constraints", In 2009 IEEE International Conference on Data Mining Workshops, 2009, 11 pages.

Calmon et al., "Optimized pre-processing for discrimination prevention", In Advances in Neural Information Processing Systems, 2017, pp. 3992-4001.

Cheng et al., "A contrastive log-ratio upper bound of mutual information", Proceedings of the 37 th International Conference on Machine Learning, 2020, 14 pages.

Cho et al., "A fair classifier using mutual information". In 2020 IEEE International Symposium on Information Theory (ISIT), IEEE, 2020, 6 pages.

Cleary et al., "Test bias: Validity of the scholastic aptitude test for negro and white students in integrated colleges", ETS Research Bulletin Series, 1966, 25 pages.

Cortes et al., "Learning with rejection". In International Conference on Algorithmic Learning Theory, 2016, 15 pages.

Devlin et al., "BERT: Pre-training of Deep Bidirectional Transformers for Language Understanding", arXiv, Oct. 2018, 14 pages.

Franc et al., "On discriminative learning of prediction uncertainty". In International Conference on Machine Learning, PMLR, 2019, 9 pages.

Geifman et al., "Selective Classification for Deep Neural Networks", In Advances in neural information processing systems, 2017, 10 pages.

Grari et al., "Fairness-Aware Neural Reyni Minimization for Continuous Features", arXiv, Nov. 12, 2019, 8 pages.

Hardt et al., "Equality of opportunity in supervised learning", In Advances in Neural Information Processing Systems, Dec. 2016, 9 pages.

He et al., "Deep residual learning for image recognition". In Proceedings of the IEEE conference on computer vision and pattern recognition, 2016, pp. 770-778.

Huang et al., "Densely connected convolutional networks". In Proceedings of the IEEE conference on computer vision and pattern recognition, 2017, pp. 4700-4708.

Irvin et al., "Chexpert: A large chest radiograph dataset with uncertainty labels and expert comparison". In Proceedings of the AAAI Conference on Artificial Intelligence, vol. 33, 2019, pp. 590-597.

Jones et al., "Selective classification can magnify disparities across groups", arXiv, Oct. 2020, 32 pages.

Kohavi, "Scaling up the accuracy of naive-bayes classifiers: A decision-tree hybrid", In Kdd, vol. 96, 1996, pp. 202-207.

Larson et al., "How We Analyzed the COMPAS Recidivism Algorithm", ProPublica, retrived form the link-https://www.propublica.org/article/how-we-analyzed-the-compas-recidivism-algorithm, May 23, 2016, 16 pages.

Lee et al. "A Maximal Correlation Approach to Imposing Fairness in Machine Learning", ICASSP 2022—2022 IEEE International Conference on Acoustics, Speech and Signal Processing (ICASSP), May 2022, 5 pages.

Liu et al., "Deep learning face attributes in the wild". In Proceedings of International Conference on Computer Vision (ICCV), Dec. 2015, 9 pages.

Mary et al., "Fairness-aware learning for continuous attributes and treatments". In International Conference on Machine Learning, 2019, 10 pages.

Meade, "Bias in Machine Learning: How Facial Recognition Models Show Signs of Racism, Sexism and Ageism", Medium, retrived from the link-https://medium.com/data-science/bias-in-machine-learning-how-facial-recognition- models-show-signs-of-racism-sexism-and-ageism-32549e2c972d, Dec. 14, 2019, 31 pages.

Menon et al., "The cost of fairness in binary classification", In Conference on Fairness, Accountability and Transparency, PMLR, 2018, 12 pages.

Oakden-Rayner et al., "Hidden stratification causes clinically meaningful failures in machine learning for medical imaging". In Proceedings of the ACM conference on health, inference, and learning, 2020, pp. 151-159.

Sagawa et al., "Distributionally robust neural networks for group shifts: On the importance of regularization for worst-case generalization", arXiv, Nov. 2019, 19 pages.

Selbst et al., "Fairness and abstraction in sociotechnical systems", In Proceedings of the Conference on Fairness, Accountability, and Transparency, 2019, 10 pages.

Turc et al., "Well-read students learn better: On the importance of pre-training compact models", arXiv, 2019, 12 pages.

Zafar et al., "Fairness constraints: Mechanisms for fair classification", In Artificial Intelligence and Statistics, PMLR, 2017, 9 pages.

Zemel et al., "Learning fair representations", In International Conference on Machine Learning, 2013, 9 pages.

Chouldechova Alexandra, "Fair prediction with disparate impact: A study of bias in recidivism prediction instruments", arXiv:1610.07524 [stat.AP], Oct. 24, 2016, 6 pages.

Corbtt-Davies et al., "Algorithmic decision making and the cost of fairness", KDD '17: Proceedings of the 23rd ACM SIGKDD International Conference on Knowledge Discovery and Data Mining, Aug. 4, 2017, 11 pages.

Huang et al., "On Universal Features for High-Dimensional Learning and Inference", arXiv: 1911.09105 [cs.LG], Nov. 20, 2019, 83 pages.

Pessach et al., "Algorithmic Fairness", arXiv:2001.09784 [cs.CY], Jan. 21, 2020, 31 pages.

Yildirim et al., "Leveraging uncertainty in deep learning for selective classification", arXiv: 1905.09509 [cs.LG], May 23, 2019, 10 pages.

Zhang et al., "Mitigating unwanted biases with adversarial learning". AIES '18: Proceedings of the 2018 AAAI/ACM Conference on AI, Ethics, and Society, Dec. 27, 2018, 7 pages.

* cited by examiner

Table 1. Summary of Datasets.

| Dataset | Modality | Target | Attribute |
|---|---|---|---|
| Dataset #2 | Demographics | Income | Attribute #1 |
| Dataset #1 | X-ray | Disease | Support Device |

*FIG. 8A*

Table 2. Area Under Curve Results for all Datasets.

| Dataset | Method | Area Under Accuracy Curve | Area Between Precision Curve |
|---|---|---|---|
| Dataset #2 | Baseline | 0.931 | 0.220 |
| | DRO | 0.911 | 0.116 |
| | Exemplary Disclosed Technique | 0.887 | 0.021 |
| Dataset #1 | Baseline | 0.929 | 0.064 |
| | DRO | 0.933 | 0.080 |
| | Exemplary Disclosed Technique | 0.934 | 0.031 |

*FIG. 8B*

FAIR SELECTIVE CLASSIFICATION VIA A VARIATIONAL MUTUAL INFORMATION UPPER BOUND FOR IMPOSING SUFFICIENCY

STATEMENT REGARDING PRIOR DISCLOSURES BY THE INVENTOR OR A JOINT INVENTOR

The following disclosure(s) are submitted under 35 U.S.C. 102(b)(1)(A):

Joshua Ka-Wing Lee, Yuheng Bu, Deepta Rajan, Prasanna Sattigeri, Rameswar Panda, Subhro Das, and Gregory Wornell, Fair Selective Classification via Sufficiency, In International Conference on Machine Learning 2021 Jul. 1 (pp. 6076-6086). PMLR.

BACKGROUND

The present invention relates to the electrical, electronic and computer arts, and more specifically, to classification systems.

Standard classification predicts Y from X via features $\Phi(X)$. In many applications, certain types of errors can be devastating if made by a decision system. (e.g. labeling a forged document as genuine). Selective classification is, however, a powerful tool for decision-making in scenarios where mistakes are costly but abstentions are allowed. In general, by allowing a classifier to abstain, one can improve the performance of a model at the cost of reducing coverage and classifying fewer samples. Recent work has shown, however, that in some cases, selective classification can magnify disparities between groups, and has illustrated this phenomenon on multiple real-world datasets.

SUMMARY

Principles of the invention provide techniques for data classification. In one aspect, an exemplary method includes the operations of computing one or more group-specific aggregate losses; computing one or more group-agnostic aggregate losses; computing a joint loss; computing a regularizer loss based on the one or more group-specific aggregate losses and the one or more group-agnostic aggregate losses; training one or more group-specific models based on the one or more group-specific aggregate losses; updating a feature extractor based on the regularizer loss; and updating a joint classifier based on the joint loss.

In one aspect, an apparatus comprises a memory and at least one processor, coupled to the memory, and operative to perform operations comprising computing one or more group-specific aggregate losses; computing one or more group-agnostic aggregate losses; computing a joint loss; computing a regularizer loss based on the one or more group-specific aggregate losses and the one or more group-agnostic aggregate losses; training one or more group-specific models based on the one or more group-specific aggregate losses; updating a feature extractor based on the regularizer loss; and updating a joint classifier based on the joint loss.

In one aspect, a computer program product for federated learning comprises a computer readable storage medium having program instructions embodied therewith, the program instructions executable by a computer to cause the computer to perform operations comprising computing one or more group-specific aggregate losses; computing one or more group-agnostic aggregate losses; computing a joint loss; computing a regularizer loss based on the one or more group-specific aggregate losses and the one or more group-agnostic aggregate losses; training one or more group-specific models based on the one or more group-specific aggregate losses; updating a feature extractor based on the regularizer loss; and updating a joint classifier based on the joint loss.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

techniques for enforcing the sufficiency condition for classification, which is a better condition to enforce than demographic parity or equalized opportunities for fair selective classification with respect to disparity between accuracy rates and precision rates;

faster model training time than certain conventional techniques; and a method that is more easily computable than conventional methods.

Some embodiments may not have these potential advantages and these potential advantages are not necessarily required of all embodiments. These and other features and advantages of the present invention will become apparent from the following detailed description of illustrative embodiments thereof, which is to be read in connection with the accompanying drawings.

BRIEF DESCRIPTION OF THE DRAWINGS

FIG. 8A is a table showing a summary of datasets used in experiments, in accordance with an example embodiment;

FIG. 8B is a table showing the experimental results for each tested method and dataset, in accordance with an example embodiment;

DETAILED DESCRIPTION

Introduction

As machine learning applications continue to grow in scope and diversity, their use in many industries increasingly raises many ethical and legal concerns, especially those of fairness and bias in predictions made by automated systems. As systems are trusted to aid or make pertinent decisions regarding, for example, health care, it is more important than ever that these predictions be free of bias.

The field of fair machine learning is rich with both problems and proposed solutions, aiming to provide unbiased decision systems for various applications. A number of different definitions and criteria for fairness have been proposed, as well as a variety of settings where fairness might be applied.

One major topic of interest in fair machine learning is that of fair classification, whereby a classifier is made more "fair" for some definition of fairness that varies according to the application. In general, fair classification problems arise for protected groups that are defined by a shared sensitive attribute (e.g. a demographic characteristic, such as gender), and the goal is to ensure that a system is not biased against any one group with the same sensitive attribute.

Figures 1A, 1B:
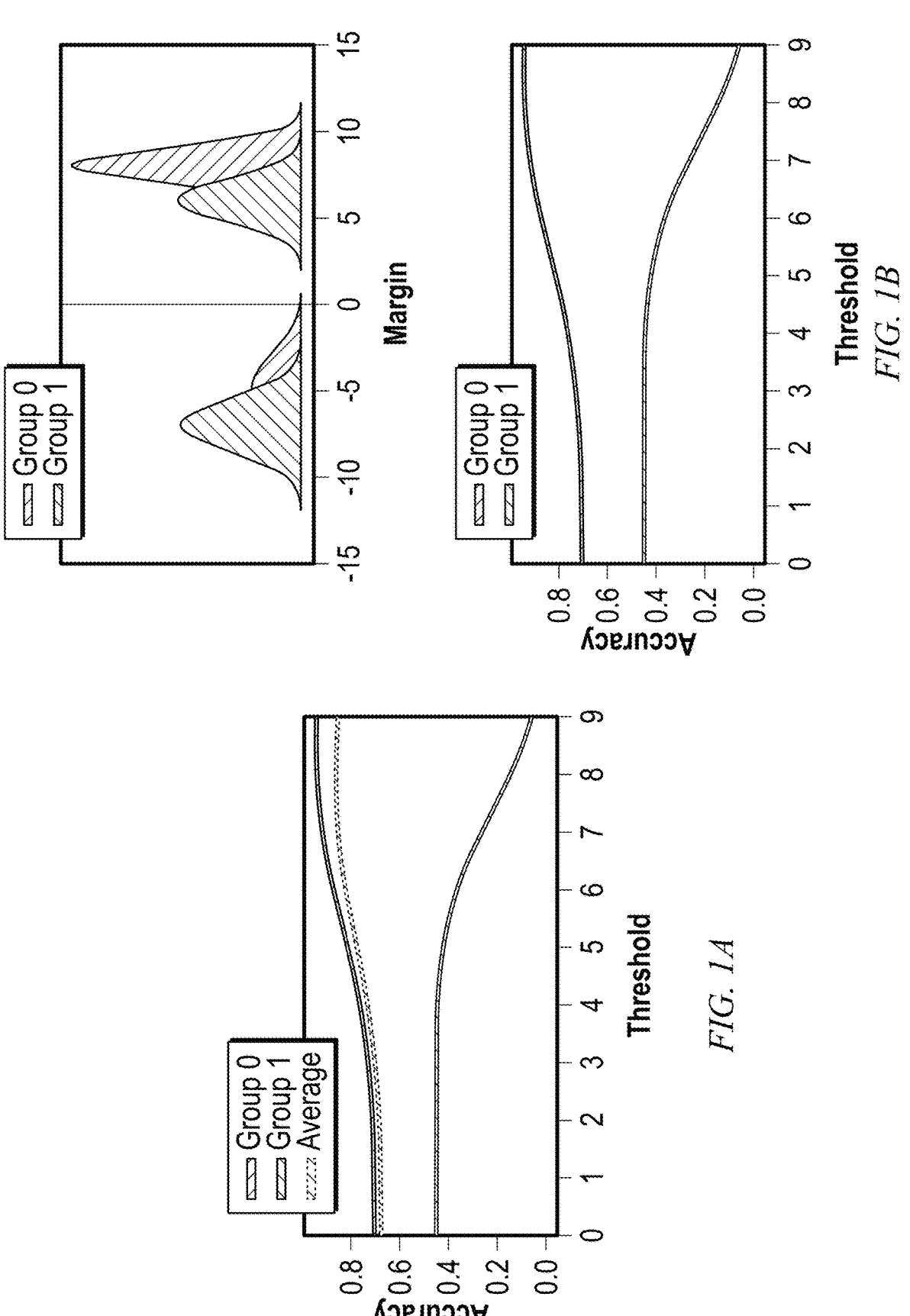
FIG. 1A is a graph of accuracy vs. threshold for two data groups, in accordance with an example embodiment.
FIG. 1B is a graph of accuracy vs. threshold for two data groups and a graph of the corresponding margin distribution, in accordance with an example embodiment.

Classifiers can have good average performance but have "blind spots" where increasing the confidence threshold may result in a decrease in the performance. FIG. 1A is a graph of accuracy vs. threshold for two data groups, in accordance with an example embodiment. Suppose data is drawn from two groups (Group 0 and Group 1), which we denote with D=0 or D=1. If we have far more samples of one group than another, confidence scores may only work on the group with more samples.

One solution is to apply the principle of selective classification, which allows the classifier to abstain from making a decision when it is unsure in its prediction, deferring to a human agent. This is done by thresholding on a confidence value $\kappa(x)$. When the confidence is a good measure of the probability of making a correct prediction, the minimum confidence threshold for making the prediction is increased (thus decreasing the coverage), and the risk on the classified samples should be seen to decrease or the accuracy over the classified samples should be seen to increase (coverage equals the fraction of samples which a prediction is made on).

In particular, one sub-setting of fair classification which exhibits an interesting fairness-related phenomenon is that of selective classification. Generally speaking, selective classification is a variant of the classification problem where a model is allowed to abstain from making a decision. This has applications in settings where making a mistake can be very costly, but abstentions are not (e.g. if the abstention results in deferring classification to a human actor).

In general, selective classification systems work by assigning some measure of confidence about their predictions, and then deciding whether or not to abstain based on this confidence, usually via thresholding.

The desired outcome is obvious: the higher the confidence threshold for making a decision (i.e. the more confident one needs to be to not abstain), the lower the coverage (proportion of samples for which a decision is made) will be. In return, better performance should be seen on the remaining samples, as a decision is only made when one is very sure of the outcome. In practice, for most datasets, with the correct choice of confidence measure and the correct training algorithm, this outcome is observed.

Recent work has revealed, however, that selective classification can magnify disparities between groups as the coverage decreases, even as overall performance increases. This, of course, has some very serious consequences for systems that require fairness, especially if it appears at first that predictions are fair enough under full coverage (i.e. when all samples are being classified).

Thus, methods are disclosed for enforcing fairness, which ensure that a classifier is fair even if it abstains from classifying a large number of samples. In particular, having a measure of confidence that is reflective of accuracy for each group can ensure that thresholding doesn't harm one group more than another. This property can be achieved by applying a condition known as sufficiency, which ensures that the predictive scores in each group are such that they provide the same accuracy at each confidence level. This condition also ensures that the precision on all groups increases when selective classification is applied, and can help mitigate the disparity between groups as coverage is decreased. It is noted that existing methods tend to apply criteria which are well-suited to solving the fair machine learning problem in the full-coverage case (i.e. when no selective classification is used), and this provides no guarantee of fairness when selective classification methods are applied. Preliminary work has suggested that Distributionally Robust Optimization (DRO) can be used to mitigate these disparities, due to its use in enforcing the equalized odds condition, but this is a method designed for the full-coverage case, and there is still some disparity between groups when thresholding on the confidence value. Other methods which impose Demographic Parity or Equality of Opportunity in the full-coverage case have similar issues.

Advantageously, techniques according to one or more embodiments are more easily computable than other methods, and can be used to enforce the sufficiency condition, which is a better condition to enforce than conditions of conventional techniques, such as demographic parity or equalized opportunities for fair selective classification, with respect to disparity between accuracy rates and precision rates. In contrast, one or more embodiments use sufficiency instead of demographic parity or equalized opportunities.

The sufficiency criteria can be formulated as enforcing a conditional independence between the label and sensitive attribute, conditioned on the learned features, and thus allows for a relaxation and optimization method that centers around the mutual information. However, to impose this criterion, the use of a penalty term is required; this term includes the conditional mutual information between two discrete or continuous variables conditioned on a third continuous variable. Existing methods for computing the mutual information for the purposes of backpropagation tend to struggle when the term in the condition involves the learned features. In order to facilitate this optimization, an upper-bound approximation of this quantity is derived.

We have found that sufficiency can be used to train fairer selective classifiers which, in one or more embodiments, ensure that precision always increases as coverage is decreased for all groups. Also disclosed herein is a novel upper bound of the conditional mutual information, which can be used as a regularizer to enforce the sufficiency criteria, and it is shown that it works to mitigate the disparities on real-world datasets.

In one example embodiment, a method is introduced for mitigating the disparity in precision across the entire coverage scale based on this criterion. The upper bound on the conditional mutual information between the class label and sensitive attribute is provided, conditioned on the learned features.

BACKGROUND

The Fair Classification Problem

In one example embodiment, the standard supervised learning setup of predicting the value of a target variable $Y \in \mathcal{Y}$ using a set of decision or predictive variables $X \in \chi$ with training samples $\{(x_1, y_1), \ldots, (x_n, x_n)\}$ is used. For example, X may be chest radiograph images, and Y is whether the individual has Pleural Effusion (PE). In general, the goal is to find features $\Phi(x) \in \mathbb{R}^{d_\Phi}$, which are predictive about Y, so that a good predictor $\hat{y} = T(\Phi(x))$ of y can be constructed under some loss criteria $L(\hat{y}, y)$.

Suppose there are sensitive attributes $D \in \mathcal{D}$ to be "fair" about (e.g. demographic characteristics), and training samples $\{(x_1, y_1, d_1), \ldots, (x_n, y_n, d_n)\}$. For example, in the healthcare industry, predictions about insurance risk should not be determined by a protected demographic characteristic (D). While D can be continuous or discrete (and the disclosed method generalizes to both cases), the initial focus is on the case where D is discrete, and refer to members which share the same value of D as being in the same group. This allows a formulation of metrics based on group-specific performance.

There are numerous metrics and criteria for what constitutes a fair classifier, many of which are mutually exclusive with one another outside of trivial cases. One important criteria is positive predictive parity, which is satisfied when the precision (which is denoted as PPV (Positive Predictive Value) wherein) for each group is the same, that is:

$$\forall a,b \in \mathcal{D}, \mathbb{P}_{(Y=1|\hat{Y}=1,D=a)} = \mathbb{P}_{(Y=1|\hat{Y}=1,D=b)} \qquad (1)$$

This criterion is especially important in applications where false positives are particularly harmful and having one group falsely labeled as being in the positive group could lead to great harm or contribute to further biases.

Looking at precision rates can also reveal disparities that may be hidden by only considering the differences in accuracies across groups.

When D is binary, one way to measure the severity of violations of this condition is to measure the difference in precision between the two groups:

$$\Delta_{PPV} \triangleq \mathbb{P}(Y = 1 \mid \hat{Y} = 1, D = 0) - \mathbb{P}(Y = 1 \mid \hat{Y} = 1, D = 1) \qquad (2)$$

Selective Classification

In selective classification, a predictive system is given the choice of either making a prediction $\hat{Y}$ or abstaining from the decision. The core assumption underlying selective classification is that there are samples for which a system is more confident about its prediction, and by only making predictions when it is confident, the performance will be improved. To enable this, a confidence score $\kappa(x)$ represents the model's certainty about its prediction on a given sample x. Then, a threshold on this value is used to decide whether to make a decision or to abstain. (The coverage is defined as the fraction of samples for which the system does not abstain on (i.e., the fraction of samples on which predictions are made).)

As is to be expected, when the confidence is a good measure of the probability of making a correct prediction, then as the minimum confidence threshold is increased for making the prediction (thus decreasing the coverage), the risk on the classified samples should be seen to decrease or the accuracy over the classified samples should be seen to increase. This leads to the accuracy-coverage tradeoff, which is central to selective classification (though the warning from the previous section about accuracy not telling the whole story is noted here).

Selective classifiers can work a posteriori by taking in an existing classifier and deriving an uncertainty measure from it for which to threshold on, or a selective classifier can be trained with an objective that is designed to enable selective classification.

One common method of extracting a confidence score from an existing network is to take the SoftMax response s(x) as a measure of confidence. In the case of binary classification, to better visualize the distribution of the scores, the confidence is defined using a monotonic mapping of s(x):

$$\kappa = \frac{1}{2} \log \left( \frac{s(x)}{1 - s(x)} \right) \qquad (3)$$

which maps [0.5, 1] to [0, ∞] and provides much higher resolution on the values close to 1.

Finally, to measure the effectiveness of selective classification, the accuracy-coverage curve can be plotted, and then the area under this curve computed to encapsulate the performance across different coverages.

Biases in Selective Classification

It has been shown that, in some cases, when coverage is decreased, the difference in recall between groups can sometimes increase, magnifying disparities between groups and increasing unfairness. In particular, it has been shown that, in the case of experimental datasets, decreasing the coverage can also decrease the recall on the worst-case group.

In general, this phenomenon occurs due to a difference between the average margin distribution and the group-specific margin distributions, resulting in different levels of performance when thresholding, as illustrated in FIG. 1B. FIG. 1B is a graph (bottom) of accuracy vs. threshold for two data groups and a graph (top) of the corresponding margin distribution, in accordance with an example embodiment. FIG. 1B illustrates that, for example, when margin distributions are not aligned (top graph), then as a sweep is performed over the threshold $\tau$, the accuracies for the groups do not necessarily move in concert with one another (bottom graph).

The margin M of a classifier is defined as $\kappa(x)$ when $\hat{y}(x)=y$ and $-\kappa(x)$ otherwise. If $\tau$ is defined as the threshold, then a selective classifier makes the correct prediction when $M(x)\geq\tau$ and incorrect predictions when $M(x)\leq-\tau$. Its probability density function (PDF) and cumulative density function (CDF) are denoted as $f_M$ and $F_M$, respectively. Then, the selective accuracy is $$A_F(\tau) = \frac{1 - F_M(\tau)}{F_M(-\tau) + 1 - F_M(\tau)} \quad (4)$$

for a given threshold. The selective precision can be analogously computed by conditioning on $\hat{Y}=1$, $$PPV_F(\tau) = \frac{1 - F_{M|\hat{Y}=1}(\tau)}{F_{M|\hat{Y}=1}(-\tau) + 1 - F_{M|\hat{Y}=1}(\tau)} \quad (5)$$

The distributions of the margin for each group can be analogously defined using $f_{M,D}$ and $F_{M,d}$ for group $d \in \mathcal{D}$.

A number of different situations for which average accuracy could increase but worst-group accuracy could decrease based on their relative margin distributions have been proposed. For example, if F is left-log-concave (e.g. Gaussian), then $A_F(\tau)$ is monotonically increasing when $A_F(0)\geq0.5$ and monotonically decreasing otherwise. Thus, if $A_F(0)>0.5$ but $A_{F_d}(0)\geq0.5$, then average accuracy may increase as $\tau$ is increased (and thus coverage decreased) but the accuracy on group d may decrease, thus resulting in magnified disparity. This same phenomenon occurs with the precision when it is conditioned on $\hat{Y}=1$. In general, when margin distributions are not aligned between groups, disparity can increase as one sweeps over the threshold $\tau$. Further subdividing groups according to their label yields the difference in recall rates observed.

Fair Selective Classification with Sufficiency

In one example embodiment, the solution to the fair selective classification problem is to apply the sufficiency criteria to the learned features.

Sufficiency requires that $Y \perp D | \hat{Y}$ or $Y \perp D | \Phi(X)$, i.e., the prediction completely subsumes all information about the sensitive attribute that is relevant to the label. When Y is binary, the sufficiency criteria requires that:

$$\mathbb{P}(y = 1 | \Phi(x), D = a) = \mathbb{P}(y = 1 | \Phi(x), D = b) \; \forall \, a, b \in \mathcal{D} \quad (6)$$

The application of this criteria to fair selective classification comes by way of Calibration by Group. Calibration by group requires that there exists a score function $R=s(x)$ such that, for all $r \in (0, 1)$:

$$\mathbb{P}(Y = 1 | R = r, \, D = a) = r \; \forall \, a \in \mathcal{D} \quad (7)$$

It can be shown that, as a sweep through the threshold is performed, performance of any one group will never be penalized in service of increasing the overall precision. Furthermore, in most real-world applications, the precision on the best-performing groups tends to saturate very quickly to values close to 1 when coverage is reduced, and thus, if it can be guaranteed that the precision increases on the worst performing group as well, then in general, the difference in precision between groups decreases as coverage decreases.

Imposing the Sufficiency Condition

From the above theorem, it can be seen that a sufficient classifier should yield the desired property of enabling fair selective classification. It should ensure that, as a sweep over the coverage is performed, the performance of one group is not penalized in the service of improving the performance of another group or improving the average performance.

In order to impose sufficiency as a fairness criteria, the following training objective is formulated as a constrained optimization of a standard loss function:

$$\min_\theta L(\hat{y}, y) \quad (8)$$

$$s.t. \, Y \perp D \, | \, \Phi(X),$$

where $\hat{y}=T(\Phi(x))$, and $\theta$ are the model parameters for both $\Phi$ and T. One possible way of representing the sufficiency constraint is by using the mutual information:

$$\min_\theta L(\hat{y}, y) \, s.t. \, I(Y; D | \Phi(X))=0. \quad (9)$$

This follows from the fact that $Y \perp D | \Phi(X)$ is satisfied if and only if $I(Y; \, D | \Phi(X))=0$. This provides a simple relaxation of the constraint into the following form:

$$\min_\theta L(\hat{y}, y)+\lambda I(Y; D | \Phi(X)). \quad (10)$$

It is noted here that existing works using mutual information for fairness are ill-equipped to handle this condition, as they assume that it is not the features that will be conditioned on, but rather that the penalty will be the mutual information between the sensitive attribute and the features (e.g. penalizing $I(\Phi(X); \, D)$ for demographic parity), possibly conditioned on the label (e.g. penalizing $I(\Phi(X); \, D|Y)$ in the case of equalized odds). As such, existing methods either assume that the variable being conditioned on is discrete, becomes unstable when the features are placed in the condition, or simply do not allow for conditioning of this type due to their formulation. Thus, in order to approximate the mutual information for the disclosed purposes, an upper bound for the mutual information must first be derived which is computable.

It can be shown that $I(Y; \, D|\Phi(X))$ can be upper bounded by $I_{UB}$ as:

$$I(Y; D | \Phi(X)) \leq \mathbb{E}_{P_{XYD}}[\log P(Y|\Phi(X),D)] - \mathbb{E}_{P_D}[\mathbb{E}_{P_{XY}}[\log P(Y|\Phi(X),D)]]. \quad (11)$$

Since $P(y|\Phi(x),d)$ is unknown in practice, a variational distribution $q(y|\Phi(x),d; \, \theta)$ with parameter $\theta$ is used to approximate it. Here, a neural net that predicts Y based on feature $\Phi(X)$ and sensitive attribute D are adopted as the variational model $q(y|\Phi(x),d; \, \theta)$.

However, in many cases, X will be continuous, high-dimensional data (e.g. images), while D will be a discrete, categorical variable (e.g. a demographic characteristic), therefore, it would be more convenient to instead formulate the model as $q(y|\Phi(x), \theta_d)$, i.e., to train a group-specific model for each $d \in D$ to approximate $P(y|\Phi(x),d)$, instead of treating D as a single input to the neural net.

Then, the first term of the upper bound can be computed as the negative cross-entropy of the training samples using the "correct" classifier for each group (group-specific loss), and the second term as the cross-entropy of the samples using a randomly-selected classifier (group-agnostic loss) drawn according to the marginal distribution $P_D$. Thus, by replacing all expectations in (16) with empirical averages, the regularizer is given by $$L_R \triangleq \frac{1}{n}\Sigma_{i=1}^{n}\Big(\log q\big(y_i \mid \Phi(x_i); \theta_{d_i}\big) - \log q\big(y_i \mid \Phi(x_i); \theta_{\tilde{d}_i}\big)\Big), \quad (12)$$

where $\tilde{d}_i$ are drawn i.i.d. from the marginal distribution PD, and for $d \in \mathcal{D}$, $$\theta_D = \arg\max_\theta \Sigma_{i:d_i=d} \log q(y_i|\Phi(x_i);\theta). \quad (13)$$

Figure 2:
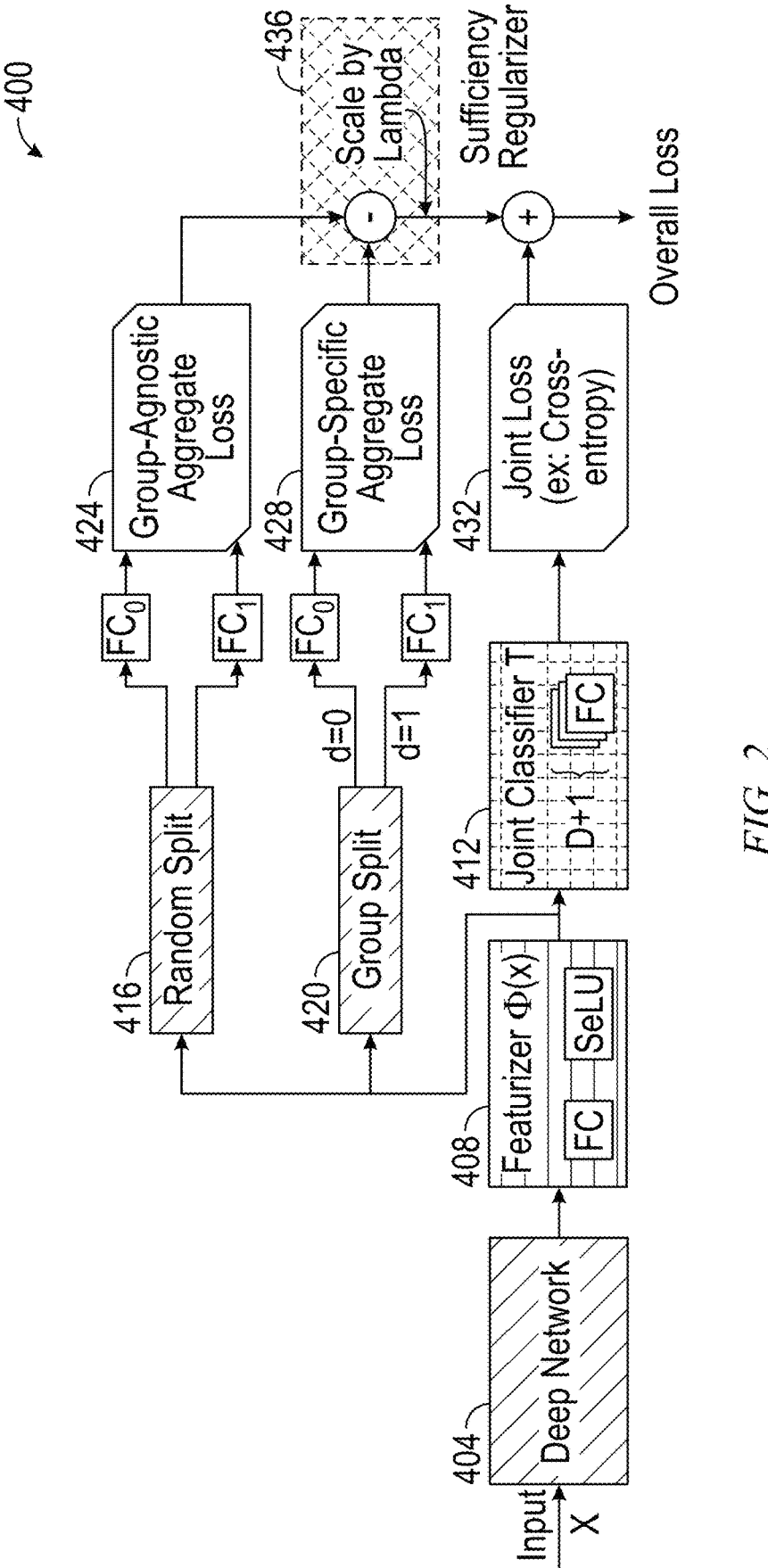
FIG. 2 is a block diagram illustrating the computation of the sufficiency-based loss when D is binary, in accordance with an example embodiment.

FIG. 2 is a block diagram illustrating a system 400 for the computation of the sufficiency-based loss when D is binary, in accordance with an example embodiment. In the embodiment of FIG. 2, the random split 416 creates $\tilde{d}_i$ and the group split 420 creates $d_i$. A group-agnostic aggregate loss module 424 generates $\log q(y_i|\Phi(x_i); \theta_{\tilde{d}_i})$ and a group-specific aggregate loss module 428 generates $\log q(y_i|\Phi(x_i); \theta_{d_i})$. The regularizer loss unit 436 then computes the regularizer loss $L_R$ based on the outputs of the group-agnostic aggregate loss module 424 and the group-specific aggregate loss module 428.

Let T denote a joint classifier over all groups which is used to make final predictions, such that $\hat{y}=T(\Phi(x))$, then the overall loss function is:

$$\min_{\theta_T,\theta_\Phi} \frac{1}{n}\sum_{i=1}^{n}\Big(L(T(\Phi(x_i)), y_i) + \quad (14)$$

$$\lambda\log q\big(y_i \mid \Phi(x_i); \theta_{d_i}\big) - \lambda\log q\big(y_i \mid \Phi(x_i); \theta_{\tilde{d}_i}\big)\Big)$$

In practice, the disclosed model is trained by alternating between the fitting steps in (18) and feature updating steps in (19) (the overall training process is described in Algorithm 1 and illustrated in FIG. 2). Intuitively, by trying to minimize the difference between the log-probability of the output of the correct model and that of the randomly-chosen one, an attempt is being made to enforce $\Phi(x)$ to have the property that all group-specific models trained on it will be the same, that is:

$$q(y|\Phi(x);\theta_a)=q(y|\Phi(x);\theta_b),\forall a,b \in \mathcal{D}. \quad (15)$$

This happens when $P(Y|\Phi(X), D)=P(Y|\Phi(X))$, which implies the sufficiency condition $Y \perp D|\Phi(X)$.
Algorithm 1: Training with Sufficiency-Based Regularizer In one example embodiment, training samples $\{(x_1, y_1, d_1), \ldots, (x_n, y_n, d_n)\}$, $\{\tilde{d}_1, \ldots, \tilde{d}_n\}$ are drawn i.i.d. (Independent and identically distributed) from the empirical distribution $\hat{P}_D$. The input X is preprocessed by a deep network 404 prior to processing by a feature extractor unit 408. For example, natural language text may be preprocessed to generate a digital representation compatible with the feature extractor unit 408. Any one of a number of known preprocessors can be used. In the case where images are being preprocessed, a 50-layer deep convolutional network is a non-limiting example. Initialize $\Phi$, T (parameterized by $\theta_\Phi$ and $\sigma_T$, respectively) and $\theta_d$ with pre-trained model, and let $n_d$ be the number of samples in group d.

In one example embodiment, a group-specific loss, defined by $L_d=-\Sigma_{i:d_i=d} \log q(y_i|\Phi(x_i); \theta)$, is computed by a group-specific aggregate loss unit 428. A joint loss, defined by $$L_0 = \frac{1}{n}\Sigma_{i=1}^{n} L(T(\Phi(x_i)), y_i),$$

is computed by a joint loss unit 432. A regularizer loss $L_0$, defined in equation (12), is computed by a regularizer loss unit 436 based on both the group-specific loss and the group-agnostic loss.

Following the computation of the above losses, the group specific models 440 are fitted by a group splitting unit 420 and a group-specific aggregate loss unit 428 according to the following algorithm:

```
for each training iteration do
    for d = 1, . . . , |𝒟| do // Fit group-specific models
        for j = 1, . . . , M do // For each batch
            θ_d ← θ_d - (1/n_d)η_d∇_θ L_d
    end
end.
```

The feature extractor is updated by the feature extractor unit 408 and the joint classifier is updated by a joint classifier unit 412 according to the following algorithm:

```
for j = 1, . . . , N do // For each batch
    θ_φ ← θ_φ - (1/n)η_f∇_{θ_φ}(L_0 + λL_R) // Update feature extractor
    θ_T ← θ_T - (1/n)η∇_{θ_T} L_0 // Update joint classifier
end
end.
```

In one example embodiment, the deep network 404, the feature extractor unit 408, the joint classifier unit 412, the random splitting unit 416, the group splitting unit 420, the group-agnostic aggregate loss unit 424, the group-specific aggregate loss unit 428, the joint loss unit 432, and the regularizer loss unit 436 are implemented on the cloud computing node 10.

Experimental Results

Datasets and Setup

FIG. 8A is a table showing a summary of datasets used in experiments, in accordance with an example embodiment. Tests on multiple datasets which are commonly used in fairness were performed. In all cases, the standard train/val/test splits packaged with the datasets was used and the code was implemented in open source machine learning framework. $\lambda$ was set to 0.7 for all datasets as well, which was chosen by sweeping over values of $\lambda$ across all datasets.

The first dataset includes 224,316 chest radiograph images from 65,240 patients with annotations for 14 different lung diseases. The binary classification task of detecting Pleural Effusion (PE) was considered. X was set to be the X-ray image of resolution 224×224, Y is whether the patient has PE, and D is the presence of a support device. A model is trained by fine-tuning a conventional model (with initialization using pre-trained weights) for 10 epochs on the dataset, with the penultimate layer as the feature extractor and the final layer as the classifier.

A second dataset includes census data drawn from the 1994 Census database, with 48,842 samples. The data X consists of demographic information about individuals, including age, education, marital status, and country of origin. Categorical variables were one-hot encoded and the binary-quantized income was designated to be the target label Y and a demographic characteristic to be the sensitive attribute D. In order to simulate the bias phenomenon discussed in the section entitled Biases in Selective Classification, all but the first 50 samples for which D=0 and Y=1 were dropped. A two-layer neural network with 80 nodes in the hidden layer was then used for classification, with the first layer serving as the feature extractor and the second as the classifier, and the network for was trained for 20 epochs.

The results were compared to a baseline where only the cross-entropy loss was optimized, as in standard classification.

Results and Discussion

Figure 3:
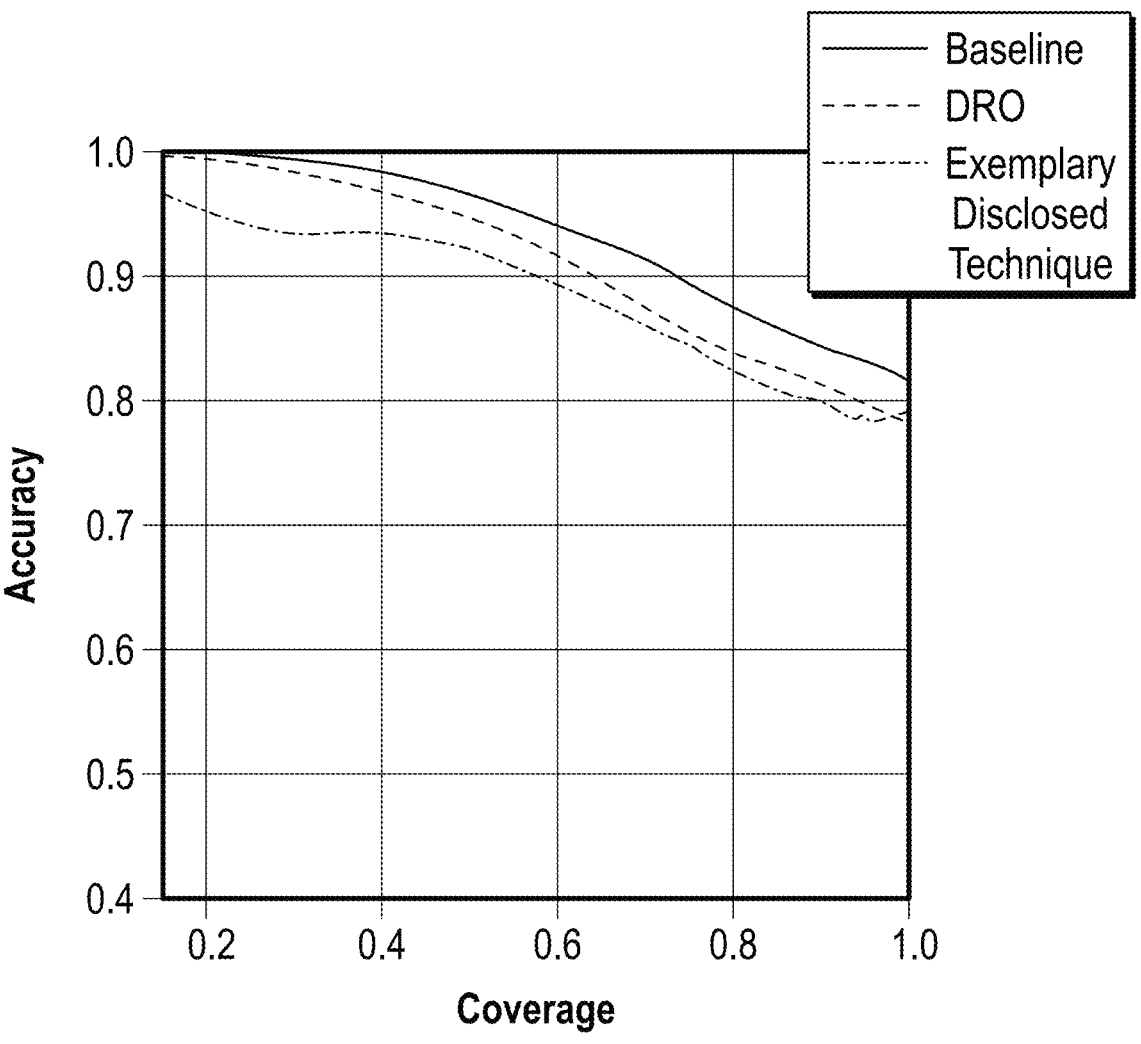
FIG. 3 shows the overall accuracy vs. coverage graphs for each method on the second dataset, in accordance with an example embodiment.

FIG. 3 shows the overall accuracy vs. coverage graphs for each method on the second dataset, in accordance with an example embodiment. It can be seen that, in all cases, selective classification increases the overall accuracy on the dataset, as is to be expected.

Figure 4:
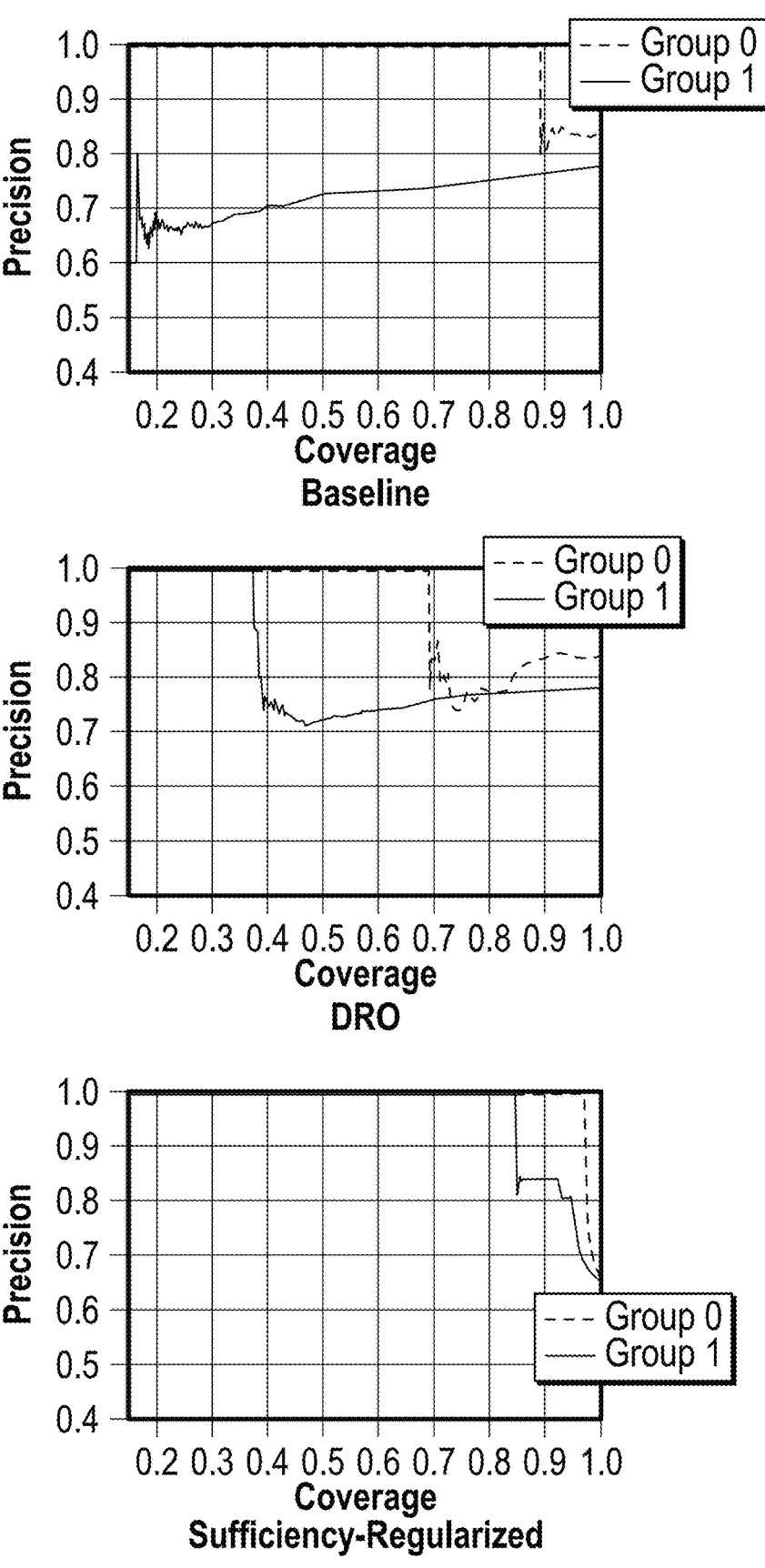
FIG. 4 shows graphs for group-specific precision-coverage curves for the second dataset for three methods, in accordance with an example embodiment.
Figure 6:
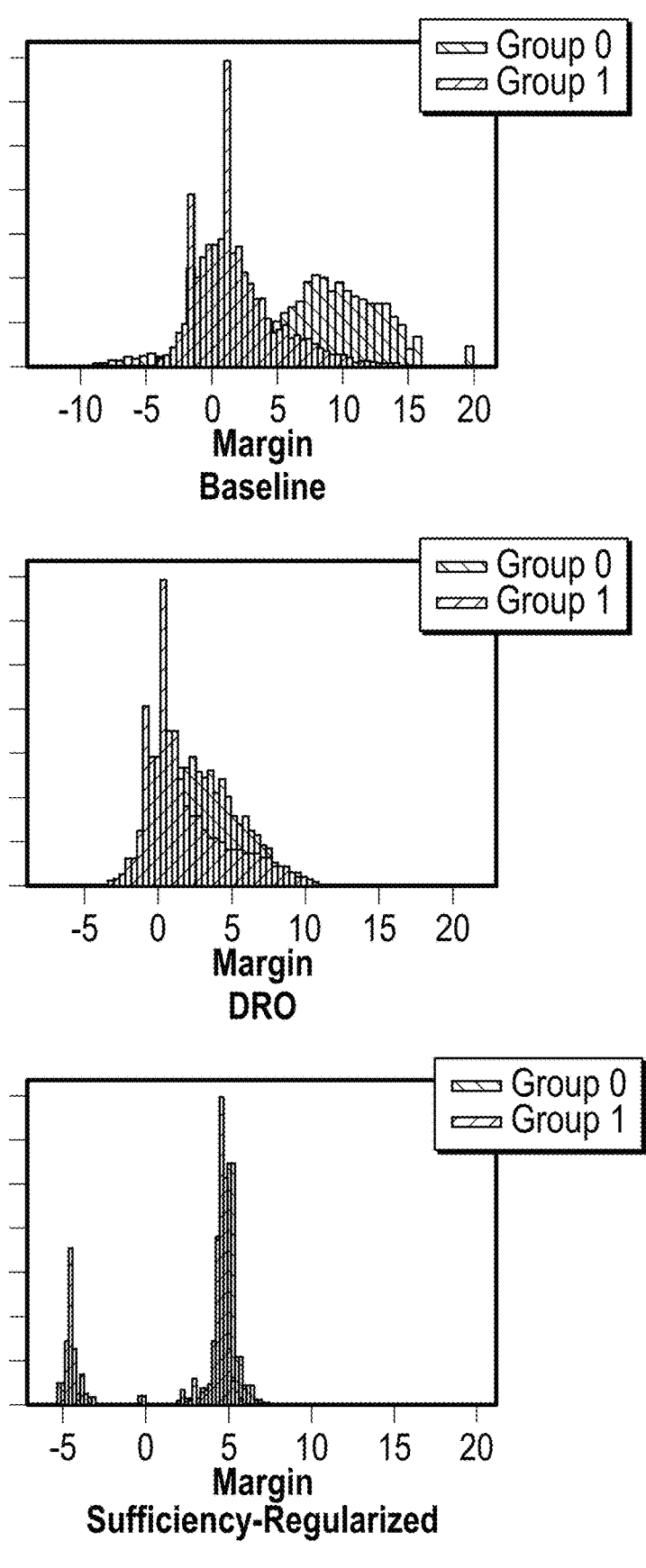
FIG. 6 shows the margin distribution histograms for the second dataset for three methods, in accordance with an example embodiment.

FIG. 4 shows graphs for group-specific precision-coverage curves for the second dataset for three methods, in accordance with an example embodiment. However, when the group-specific precisions in FIG. 4 are reviewed, it is observed that, for the baseline method, this increase in performance comes at the cost of worse performance on the worst-case group. This phenomenon is heavily mitigated in the case of Distributionally Robust Optimization (DRO), but there is still a gap in performance in the mid-coverage regime. Finally, the disclosed method shows the precisions converging to equality as coverage decreases very quickly. This can be explained by looking at the margin distributions for each method. FIG. 6 shows the margin distribution histograms for the second dataset for three methods, in accordance with an example embodiment. It can be seen that the margin distributions are mismatched for the two groups in the baseline and Distributionally Robust Optimization cases, but aligned for the disclosed sufficiency-based method.

Figure 5:
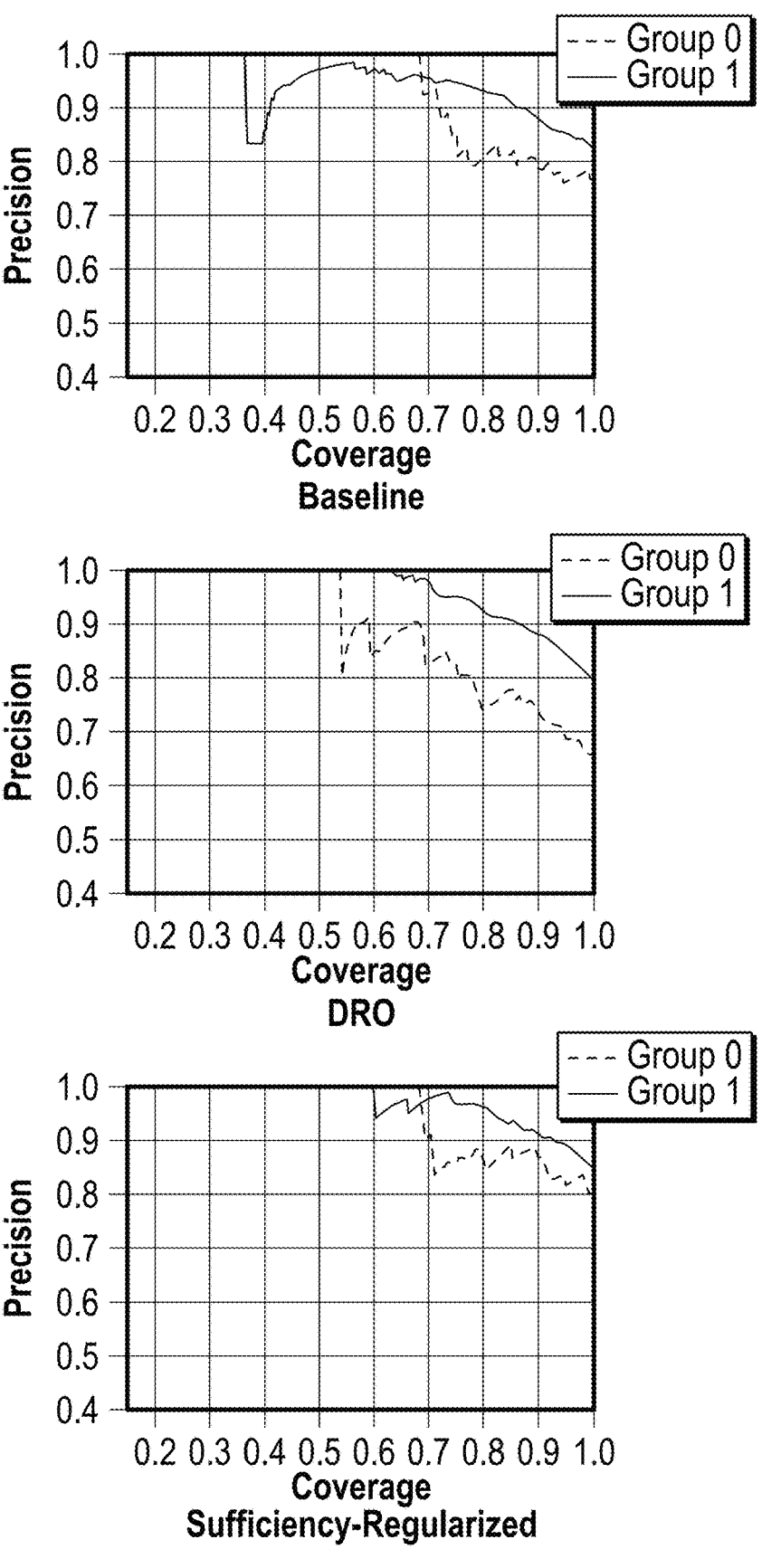
FIG. 5 shows the group precisions for a first dataset, in accordance with an example embodiment.
Figure 7:
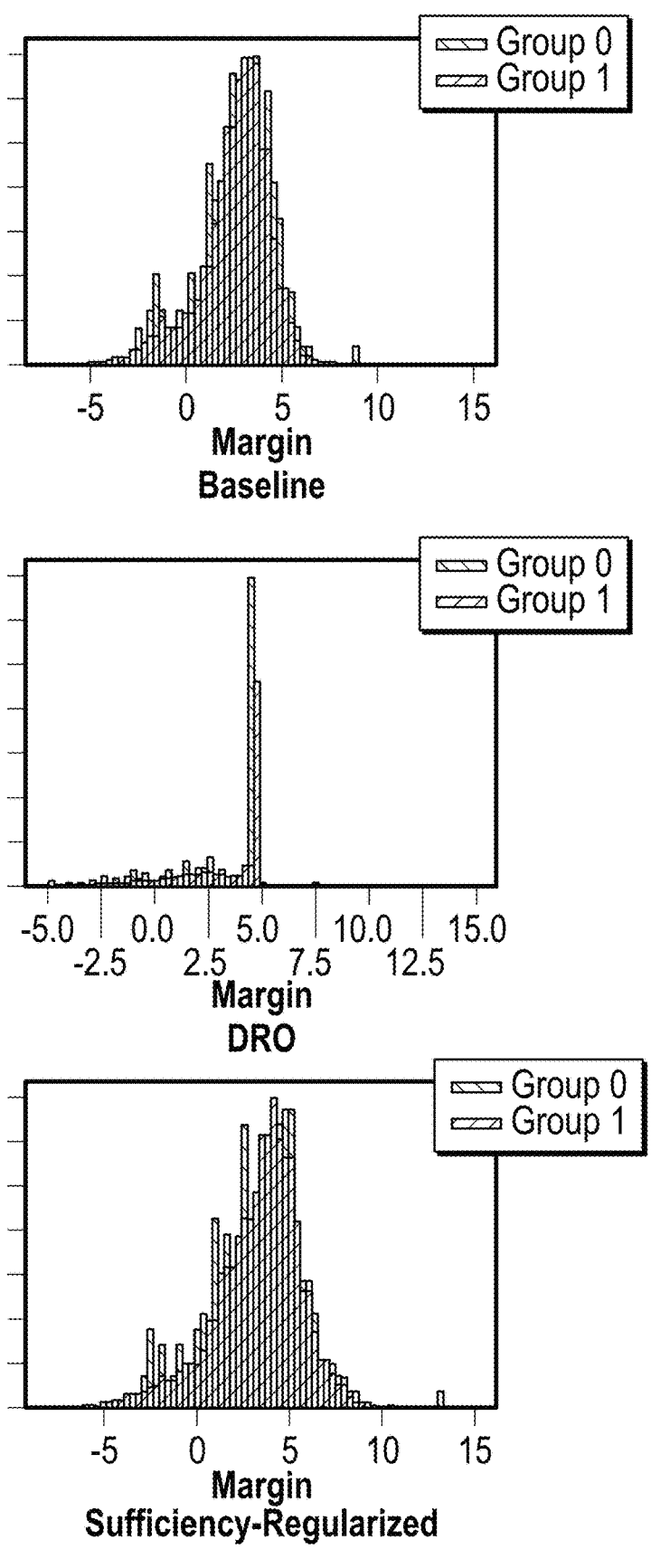
FIG. 7 shows the margin distributions for the first dataset, in accordance with an example embodiment.

FIGS. 5 and 7 show the group precisions and margin distributions for the first dataset, in accordance with an example embodiment. It can be seen that the disclosed method produces a smaller gap in precision at almost all coverages compared to the other two methods, and improves the worst-group precision. Note, in this use-case the presence of a support device (e.g., chest tubes) is spuriously correlated to being diagnosed as having Pleural Effusion (PE). Thus, the worst-case group includes X-rays with a support device, that are diagnosed as PE negative.

Finally, in order to numerically evaluate the relative performances of the algorithms for all the datasets, the following quantities are computed: area under the average accuracy-coverage curve and area under the absolute difference in precision-coverage curve (or area between the precision-coverage curve for the two groups). FIG. 8B is a table showing the experimental results for each tested method and dataset, in accordance with an example embodiment.

From this, it is clear that, while the disclosed method may incur a small decrease in overall accuracy in some cases, it reduces the disparity between the two groups, as desired.

Thus, techniques are provided for enforcing fairness in selective classification using a novel application of a novel bound for the conditional mutual information.

As discussed below, although, an exemplary system can be hosted completely in a cloud environment, it is also suitable for a hybrid setting where some components reside in the cloud and the remaining components reside on a local infrastructure. In one example embodiment, data is stored in local databases, while the compute models run on shared clusters and the frontend services operate in a public cloud infrastructure.

Given the discussion thus far, it will be appreciated that, in general terms, an exemplary method, according to an aspect of the invention, includes the operations of computing one or more group-specific aggregate losses; computing one or more group-agnostic aggregate losses; computing a joint loss; computing a regularizer loss based on the one or more group-specific aggregate losses and the one or more group-agnostic aggregate losses; training one or more group-specific models 440 based on the one or more group-specific aggregate losses; updating a feature extractor 408 based on the regularizer loss; and updating a joint classifier 412 based on the joint loss.

In one or more embodiments, the regularizer loss is defined using group-specific loss and the group-agnostic loss, see equation (12).

In one example embodiment, a measure of confidence about a prediction is assigned and an abstention decision is determined based on the measure of confidence and a corresponding threshold utilizing the joint classifier 412 (in one or more embodiments, only the joint classifier 412 is used for prediction, which does not require the group information). In one example embodiment, the regularizer loss (output of 436) is utilized, the regularizer comprising conditional mutual information between two variables conditioned on a third continuous variable to impose a sufficiency criteria based on the group-agnostic aggregate loss (output of 424) and the group-specific aggregate loss (output of 428). In one example embodiment, an upper bound of conditional mutual information that is used as a basis of the regularizer loss to enforce a sufficiency criteria is derived.

In one example embodiment, the upper bound of conditional mutual information is defined as:

$$I(Y;D|\Phi(X)) \leq \mathbb{E}_{P_{XYD}}[\log P(Y|\Phi(X),D)] - \mathbb{E}_{P_D}[$$
$$\mathbb{E}_{P_{XY}}[\log P(Y|\Phi(X),D)]],$$

wherein X is a predictive variable, Y is a target variable, D is a sensitive attribute, and $\Phi(X) \in \mathbb{R}^{d_\Phi}$ are features.

In one example embodiment, the deriving of the upper bound further comprises computing a first term of the upper bound as a negative cross-entropy of training samples using a correct classifier for each group as a group-specific loss and a second term of the upper bound as a cross-entropy of the training samples using a randomly-selected classifier as a group-agnostic loss drawn according to a marginal distribution $P_D$. In one example embodiment, the updating is performed to find features $\Phi(x) \in \mathbb{R}^{d_\Phi}$, which are predictive about target variable Y so that a good predictor $\hat{y}=T(\Phi(x))$ of training sample y can be constructed under a loss criteria $L(\hat{y}, y)$.

In one example embodiment, a model is formulated as $q(y|\Phi(x), \theta_d)$ to train one of the group-specific models for each group $d \in D$ to approximate $P(y|\Phi(x),d)$, wherein y is a training sample, $\Phi(x)$ is a feature, and $\theta_d$ represents parameters trained on data d. In one example embodiment, a classification process that reduces bias in a classification task is performed using the updated joint classifier. In one example embodiment, distribution of at least one physical resource is controlled in accordance with results of the reduced bias classification process. In one example embodiment, the physical resource is one or more of electrical power, water, and computing resources. In one example embodiment, the method is repeated for each batch of training data.

In one aspect, an apparatus comprises a memory and at least one processor, coupled to the memory, and operative to perform operations comprising computing one or more group-specific aggregate losses; computing one or more group-agnostic aggregate losses; computing a joint loss; computing a regularizer loss based on the one or more group-specific aggregate losses and the one or more group-agnostic aggregate losses; training one or more group-specific models 440 based on the one or more group-specific aggregate losses; updating a feature extractor 408 based on the regularizer loss; and updating a joint classifier 412 based on the joint loss.

In one aspect, a computer program product for federated learning comprises a computer readable storage medium having program instructions embodied therewith, the program instructions executable by a computer to cause the computer to perform operations comprising computing one or more group-specific aggregate losses; computing one or more group-agnostic aggregate losses; computing a joint loss; computing a regularizer loss based on the one or more group-specific aggregate losses and the one or more group-agnostic aggregate losses; training one or more group-specific models 440 based on the one or more group-specific aggregate losses; updating a feature extractor 408 based on the regularizer loss; and updating a joint classifier 412 based on the joint loss. In one example embodiment, the physical resource is online recommendations.

In one example embodiment, feature $\Phi$ and T are initialized, parameterized by $\theta_\phi$ and $\theta_T$, respectively, and $\theta_d$ with a pre-trained model, where $n_d$ is a count of samples in a group d of training samples $\{(x_1, y_1, d_1), \ldots, (x_n, y_n, d_n)\}$, $\{\tilde{d}_1, \ldots, \tilde{d}_n\}$; and wherein:

the computing the one or more group-specific aggregate losses is based on $L_d = -\Sigma_{i:d_i=d} \log q(y_i|\Phi(x_i); \theta)$;

the computing the joint loss is based on $$L_0 = \frac{1}{n}\Sigma_{i=1}^n L(T(\Phi(x_i)), y_i);$$

the computing the regularizer loss $L_0$ is based on $$L_R \triangleq \frac{1}{n}\Sigma_{i=1}^n \left(\log q(y_i \mid \Phi(x_i); \theta_{d_i}) - \log q(y_i \mid \Phi(x_i); \theta_{\tilde{d}_i})\right),$$

the fitting the group-specific models for each batch is performed by setting $\theta_d$ to $$\theta_d - \frac{1}{n_d}\eta_d \nabla_\theta L_d$$

for $d=1, \ldots, |\mathcal{D}|$ and for $j=1, \ldots, M$;
the updating the feature extractor is performed by setting $\theta_\phi$ to $$\theta_\phi - \frac{1}{n}\eta_f \nabla_{\theta_\phi} (L_0 + \lambda L_R)$$

for $j=1, \ldots, N$; and
the updating the joint classifier is performed by setting $\theta_T$ to $$\theta_T - \frac{1}{n}\eta \nabla_{\theta_T} L_0$$

for $j=1, \ldots, N$.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
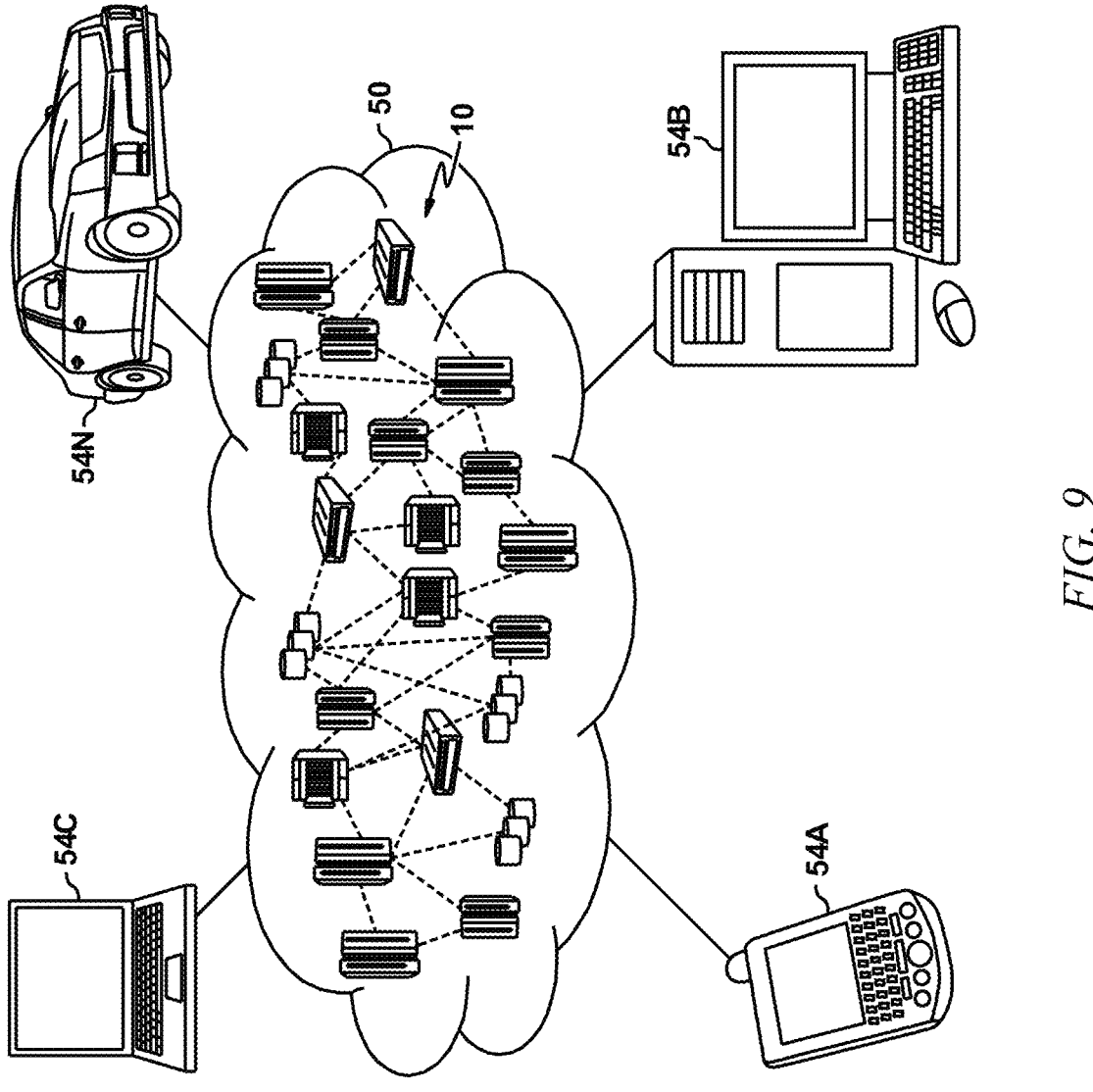
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
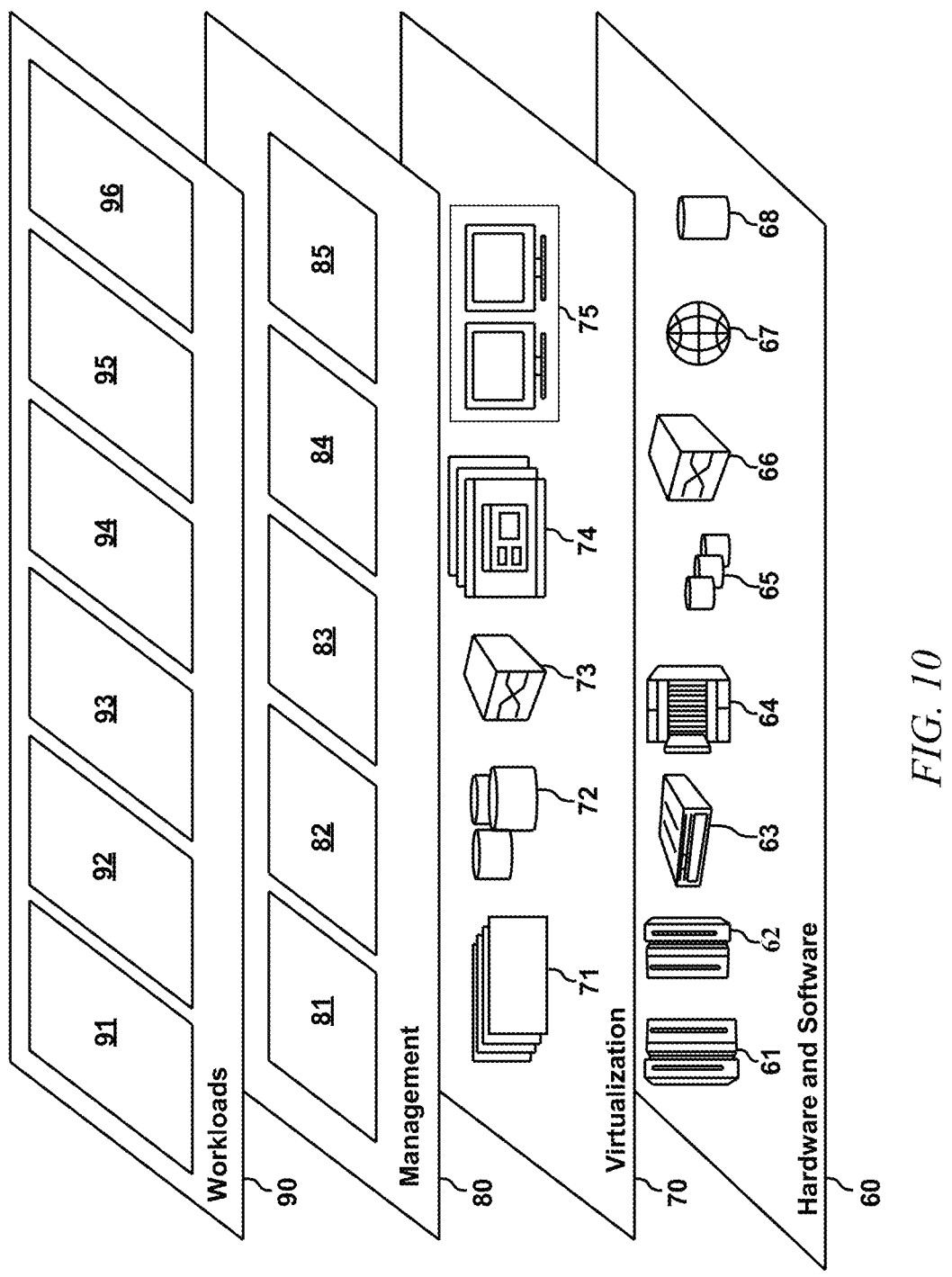
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at least a portion of a data classification component 96. For example, an entire system according to aspects of the invention could be run on/hosted in the cloud, one or more embodiments can also work in a hybrid setting where some components can be on the cloud and the rest on local infrastructure. By way of a non-limiting example, data can be stored in local databases, while the compute models can run on shared clusters and the frontend services can operate based on public cloud infrastructure.

Figure 11:
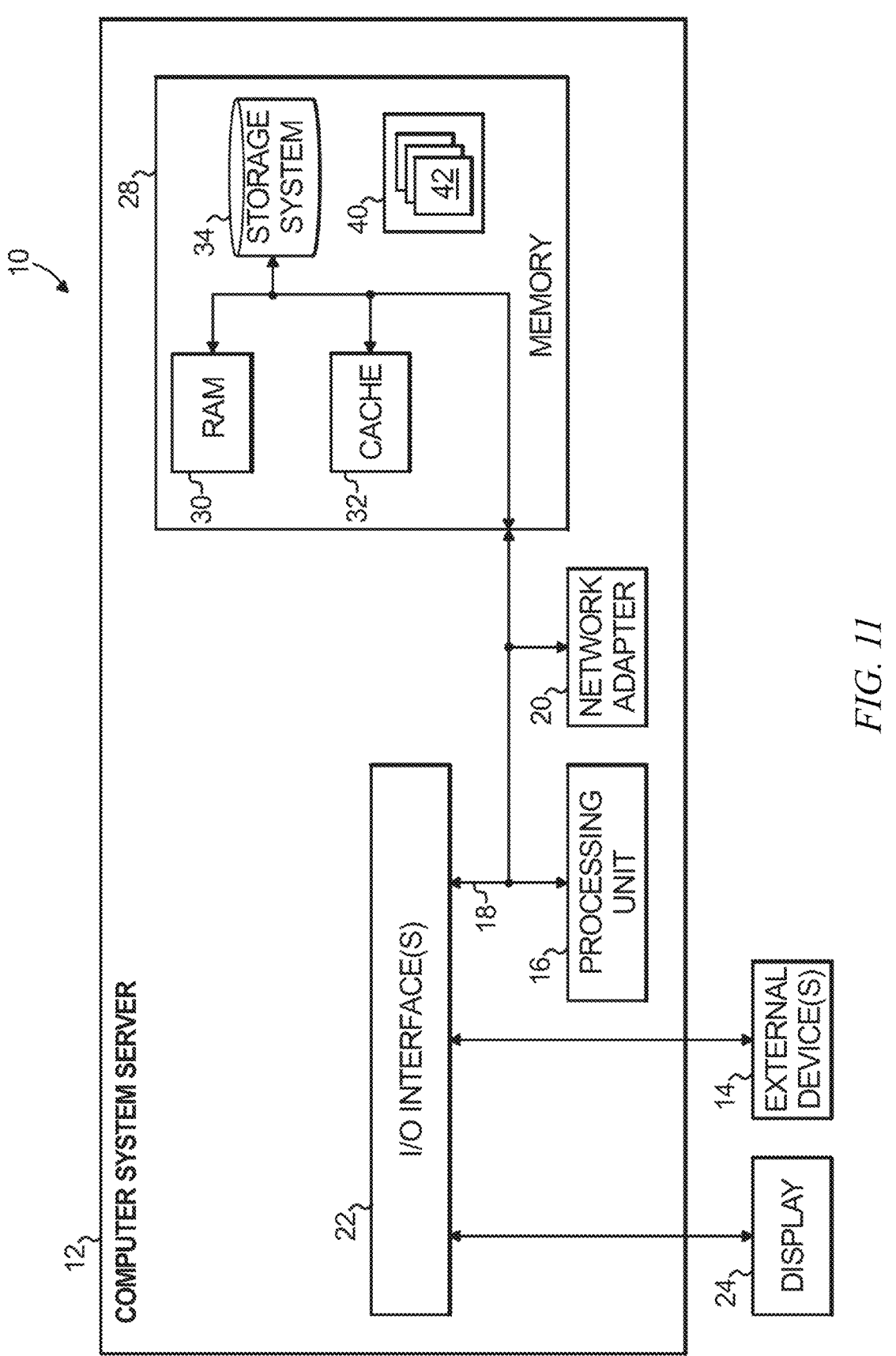
FIG. 11 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 11 depicts a computer system that may be useful in implementing one or more aspects and/or elements of the invention, also representative of a cloud computing node according to an embodiment of the present invention. Referring now to FIG. 11, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 11, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 11) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

computing, using at least one processor, one or more group-specific aggregate losses;

computing, using the at least one processor, one or more group-agnostic aggregate losses;

computing, using the at least one processor, a joint loss;

computing, using the at least one processor, a regularizer loss based on the one or more group-specific aggregate losses and the one or more group-agnostic aggregate losses;

training, using the at least one processor, one or more group-specific models based on the one or more group-specific aggregate losses;

updating, using the at least one processor, a feature extractor based on the regularizer loss;

updating, using the at least one processor, a joint classifier based on the joint loss;

performing, using the updated joint classifier, a classification process that reduces bias in a classification task; and facilitating distribution of at least one physical resource in accordance with results of the reduced bias classification process.

2. The method of claim 1, further comprising assigning a measure of confidence about a prediction and determining an abstention decision based on the measure of confidence and a corresponding threshold utilizing the joint classifier.

3. The method of claim 1, further comprising utilizing the regularizer loss, the regularizer comprising conditional mutual information between two variables conditioned on a third continuous variable to impose a sufficiency criteria based on the group-agnostic aggregate loss and the group-specific aggregate loss.

4. The method of claim 1, further comprising deriving an upper bound of conditional mutual information that is used as a basis of the regularizer loss to enforce a sufficiency criteria.

5. The method of claim 4, wherein the upper bound of conditional mutual information is defined as:

$$I(Y;D|\Phi(X)) \leq \mathbb{E}_{P_{XYD}}[\ \log P(Y|\Phi(X),D)]-$$
$$\mathbb{E}_{P_D}[\ \mathbb{E}_{P_{XY}}[\ \log P(Y|\Phi(X),D)]], XY[\ \log P(Y|\Phi(X),D)]],$$

wherein X is a predictive variable, Y is a target variable, D is a sensitive attribute, and $\Phi(X) \in \mathbb{R}^{d_\Phi}$ are features.

6. The method of claim 4, wherein the deriving of the upper bound further comprises computing a first term of the upper bound as a negative cross-entropy of training samples using a correct classifier for each group as a group-specific loss and a second term of the upper bound as a cross-entropy of the training samples using a randomly-selected classifier as a group-agnostic loss drawn according to a marginal distribution $P_D$.

7. The method of claim 1, wherein the updating is performed to find features $\Phi(x) \in \mathbb{R}^{d_\Phi}$, which are predictive about target variable Y so that a good predictor $\hat{y}=T(\Phi(x))$ of training sample y can be constructed under a loss criteria $L(\hat{y},y)$.

8. The method of claim 1, wherein a model is formulated as $q(y|\Phi(x),\theta_d)$ to train one of the group-specific models for each group $d \in D$ to approximate $P(y|\Phi(x),d)$, wherein y is a training sample, $\Phi(x)$ is a feature, and $\theta_d$ represents parameters trained on data d.

9. The method of claim 1, wherein the physical resource is one or more of electrical power and water and wherein the facilitating of distribution comprises actual distribution of one or more of electrical power and water in accordance with reduced bias classification by sending signals from the at least one processor via a network interface.

10. The method of claim 1, wherein the method is repeated for each batch of training data.

11. An apparatus comprising:

a memory; and at least one processor, coupled to said memory, and operative to perform operations comprising:

computing one or more group-specific aggregate losses;

computing one or more group-agnostic aggregate losses;

computing a joint loss;

computing a regularizer loss based on the one or more group-specific aggregate losses and the one or more group-agnostic aggregate losses;

training one or more group-specific models based on the one or more group-specific aggregate losses;

updating a feature extractor based on the regularizer loss;

updating a joint classifier based on the joint loss;

performing, using the updated joint classifier, a classification process that reduces bias in a classification task; and facilitating distribution of at least one physical resource in accordance with results of the reduced bias classification process.

12. The apparatus of claim 11, the operations further comprising assigning a measure of confidence about a prediction and determining an abstention decision based on the measure of confidence and a corresponding threshold utilizing the joint classifier.

13. The apparatus of claim 11, the operations further comprising utilizing the regularizer loss, the regularizer comprising conditional mutual information between two variables conditioned on a third continuous variable to impose a sufficiency criteria based on the group-agnostic aggregate loss and the group-specific aggregate loss.

14. The apparatus of claim 11, the operations further comprising deriving an upper bound of conditional mutual information that is used as a basis of the regularizer loss to enforce a sufficiency criteria, wherein the upper bound of conditional mutual information is defined as:

$$I(Y;D|\Phi(X)) \leq \mathbb{E}_{P_{XYD}}[\log P(Y|\Phi(X),D)] - \mathbb{E}_{P_D}[\mathbb{E}_{P_{XY}} \log P(Y|\Phi(X),D)]],$$

wherein X is a predictive variable, Y is a target variable, D is a sensitive attribute, and $\Phi(X) \in \mathbb{R}^{d_\Phi}$ are features.

15. The apparatus of claim 11, wherein the updating is performed to find features $\Phi(x) \in \mathbb{R}^{d_\Phi}$, which are predictive about target variable Y so that a good predictor $\hat{y} = T(\Phi(x))$ of training sample y can be constructed under a loss criteria $L(\hat{y},y)$.

16. The apparatus of claim 11, wherein a model is formulated as $q(y|\Phi(x),\theta_d)$ to train one of the group-specific models for each group $d \in D$ to approximate $P(y|\Phi(x),d)$, wherein y is a training sample, $\Phi(x)$ is a feature, and $\theta_d$ represents parameters trained on data d.

17. The apparatus of claim 11, the operations further comprising performing, using the updated joint classifier, a classification process that reduces bias in a classification task.

18. A computer program product for federated learning, the computer program product comprising a computer readable storage medium having program instructions embodied therewith, the program instructions executable by a computer to cause the computer to perform operations comprising:

computing one or more group-specific aggregate losses;

computing one or more group-agnostic aggregate losses;

computing a joint loss;

computing a regularizer loss based on the one or more group-specific aggregate losses and the one or more group-agnostic aggregate losses;

training one or more group-specific models based on the one or more group-specific aggregate losses;

updating a feature extractor based on the regularizer loss;

updating a joint classifier based on the joint loss;

performing, using the updated joint classifier, a classification process that reduces bias in a classification task; and facilitating distribution of at least one physical resource in accordance with results of the reduced bias classification process.

\* \* \* \* \*